United States Patent [19]
Blanch et al.

[11] Patent Number: 5,389,432
[45] Date of Patent: Feb. 14, 1995

[54] BINDERS BASED ON α-OLEFIN/CARBOXYLIC ACID/POLYAMIDE POLYMERS AND THEIR IONOMERS

[75] Inventors: Robert M. Blanch, Convent Station; Gregory Borsinger, Boonton, both of N.J.

[73] Assignee: AlliedSignal Inc., Morris Township, Morris County, N.J.

[21] Appl. No.: 4,879

[22] Filed: Jan. 19, 1993

[51] Int. Cl.$^6$ .................................................. B32B 7/14
[52] U.S. Cl. ................................ 428/288; 427/389.9; 428/290
[58] Field of Search ................................ 428/288, 290; 427/389.9

[56] References Cited

U.S. PATENT DOCUMENTS

| | | | |
|---|---|---|---|
| 3,388,186 | 6/1968 | Kray | 525/183 |
| 4,132,690 | 1/1979 | Eernstman | 524/270 |

FOREIGN PATENT DOCUMENTS

| | | |
|---|---|---|
| 0441647A1 | 8/1991 | European Pat. Off. . |
| 2028343 | 3/1990 | United Kingdom . |
| WO89/01691 | 3/1989 | WIPO . |

*Primary Examiner*—Jenna L. Davis
*Attorney, Agent, or Firm*—Melanie L. Brown; Roger H. Criss

[57] ABSTRACT

The present invention is an article of manufacture comprising a substrate having a binder composition applied thereon. The binder applied to the substrate comprising a polymeric backbone comprising recurring monomeric units derived from monomers selected from the group consisting of one or more α-olefins and one or more unsaturated carboxylic acids, said backbone having grafted thereto, by a divalent amide linkage, one or more polymeric grafts comprising at least one recurring monomeric unit derived from monomers selected from the group consisting of:

—NHC(O)RC(O)NHR$_1$ and —NH—R—C(O)— or a combination thereof, wherein R is an alkylene group of at least about 2 carbon atoms, and R$_1$ is R or aryl. The present invention also includes a process for preparing the article of manufacture.

27 Claims, No Drawings

BINDERS BASED ON α-OLEFIN/CARBOXYLIC ACID/POLYAMIDE POLYMERS AND THEIR IONOMERS

BACKGROUND OF THE INVENTION

1. Field of the Invention

This invention pertains to articles of manufacture utilizing a substrate treated with a chemical emulsion binder. The substrate is then dried to improve the strength and structural integrity of the substrate materials. More particularly, the present invention pertains to articles of manufacture having substrates bound with aqueous dispersions of copolymers having a backbone of recurring α-olefin and carboxylic acid monomeric units, having grafted thereto one or more polymeric grafts with the following recurring monomeric units:

—NHC (O) RC (O) NHR$_1$ and —NH—R—C (O)— or a combination thereof, wherein R is an alkylene group of at least about 2 carbon atoms, and R$_1$ is R or aryl.

2. Description of Related Art

Application of a binder material to a substrate to increase its toughness, tensile strength and other physical properties is a technique well known in the art, as set forth, for example, in Olkers and Sweeney, *Latex Binders and Binding Techniques for Disposable*, TAPPI Proceedings, 1988 Nonwovens Conference, TAPPI Press, 1988.

The prior art with respect to non-formaldehyde binder systems has suggested use of urethane and acrylic polymers. For example, U.S. Pat. No. 2,837,462 to Van Norden Morin describes treatment of a nonwoven fabric with a binder comprising copolymers of vinyl acetate and an alkyl acrylate. The nonwoven fabric described in U.S. Pat. No. 4,207,367 to Baker is treated with a cross-linkable acrylic latex. U.S. Pat. No. 4,381,332 to Fulmer, et al. describes a nonwoven fabric treated with an elastomeric cross-linked polyurethane gel. The formaldehyde-free nonwoven binder material described in U.S. Pat. No. 5,030,507 to Mudge, et al. is treated with a binder comprising alkyl acrylates in combination with styrene, acrylonitrile, vinyl acetates and combinations thereof, isopropyl-α,αdimethyl benzyl isocyanate, and a multifunctional monomer.

SUMMARY OF THE INVENTION

The present invention is an article of manufacture comprising a substrate, which may be a natural or synthetic fiber, or may comprise an arrangement of overlapping and intersecting fibers. All or a portion of the substrate materials utilized in the present invention are bound by a polymeric binder material. The binder of the present invention comprises two essential components, a backbone polymeric block and a graft polymeric block. The polymeric backbone comprises recurring monomeric units derived from monomers selected from the group consisting of one or more α-olefins and one or more unsaturated carboxylic acids. The polymeric backbone may include unreacted pendent carboxylic acid functions, which may be further reacted with an alkaline substance to be partially or fully neutralized; or, may be unneutralized. Connected to the backbone are reaction residues formed by the reaction of the acid functions of the backbone and amine functions of one or more polymeric grafts comprising recurring monomeric units derived from monomers selected from the group consisting of:

—NHC (O) RC (O) NHR$_1$ — and —NH—R—C (O)— or a combination thereof, wherein R is an alkylene group of at least about 2 carbon atoms, and R$_1$ is R or aryl.

The binder utilized in the present invention improves the structural integrity and strength characteristics of the substrate. Further, when utilized with a substrate made up of an arrangement of fibers, a major portion of the binder of the present invention concentrates at points at which the overlapping fibers intersect in the substrate; therefore, following application of a relatively reduced amount of the binder to the substrate, the present article exhibits an acceptable tensile strength, percent elongation, and toughness, and may be produced with reduced material waste.

The present invention further includes a process for producing the article above, which comprises the following steps:

(1) contacting fibers with a liquid medium having the binder composition described above dispersed therein; and (2) drying said binder composition.

The process of the present invention provides one or more advantages; for example, the chemical structure of the binder utilized in the present invention does not include functions which evolve harmful by-products, such as formaldehyde and the like, during drying. The binder applied to the present article is dried at a low temperature, so production of harmful by-products is minimized.

DETAILED DESCRIPTION OF THE INVENTION

The present invention utilizes a substrate, which may be natural or synthetic fibers, or an arrangement of such fibers. The substrate materials having A binder composition is applied to these substrate materials, and the materials are dried.

In the event that the binder material is applied to an arrangement of fibers, such as, for example, a nonwoven web, following drying a major portion of the binder applied to the substrate concentrates in areas of fiber overlap and intersection, which are generally referred to as "overlapping areas" for purposes of the present application. For the purposes of the present application, the term overlapping areas refers to areas where the fibers making up the substrate intersect or overlay.

Scanning electron microscopy and image analysis of typical substrates indicates that at least a substantial portion of the present binder, greater than about 50%, is deposited in regions surrounding the overlapping areas. While shapes of typical regions surrounding the overlapping areas will vary widely, especially in a nonwoven substrate, the typical region surrounding the overlapping areas which is occupied by the binder material is bounded by a spheroid having a center near the point of fiber overlap and a radius of approximately 500 microns. In a preferred embodiment, at least about 70% of the binder material is deposited in regions surrounding the overlapping areas. In the most preferred embodiment, at least about 90% of the binder material is deposited in the regions surrounding the overlapping areas. Scanning electron micrographs indicate that the binder material which is not concentrated in the regions surrounding the overlapping areas is deposited where the fibers do not overlap. These areas are referred to as "non-overlap" areas for the purposes of the present application.

A conventional acrylic binder tends to spread along the entire surface of the fibers making up the substrate to form an even coating in both overlapping areas and non-overlap areas. In contrast, the present binder composition tends to collect in the overlapping areas, and avoid the non-overlap areas. The reasons for this behavior are not well understood at present, but are believed to be the result of varying surface energies of the binder system compared to the substrate. The binder of the present invention apparently exhibits a surface tension which is markedly different than the surface tension of the substrate materials; accordingly, the binder of the present invention exhibits a reduced tendency to coat the substrate materials evenly. While not wishing to be bound by any theory, it is believed that the preference shown by the present binder for the overlapping areas is due at least in part to bonding between the carboxyl groups present the binder and the materials making up the substrate. This preference for overlapping areas shown by the binder means that the bonding operation performed by the present binder material is more tenacious than the bonding performed by a like amount of conventional binders, which tend to coat all regions of the fibers with no apparent preference for the overlapping areas.

Articles having substrates bound with the binder composition described herein require less binder per unit weight of substrate, and thus can be manufactured more economically for a particular application than articles bound with conventional binder compositions. The present article exhibits excellent strength per unit weight with improved retention of the characteristics of the original substrate.

The substrate may be comprised of natural or synthetic fibers. Alternatively, these fibers may be subjected to one of several types of bonding operations to anchor the individual fibers together to form a self-sustaining web. Some of the better known methods useable to form a self-sustaining web are overall impregnation, spraying, or printing the web with intermittent or continuous straight or wavy lines, or areas of binder extending generally transversely or diagonally across the web and, if desired, along the web. In general, in a web the fibers extend in a plurality of diverse directions in general alignment with the major place of the substrate, overlapping, intersecting, and supporting one another to form an open, porous structure. This porous structure forms a random array with overlap regions where the intersecting fibers come together, as well as open porous regions.

The construction of the substrate of the present invention is not critical, and a wide variety of conventional constructions may be used. For example, the substrates for use in the present invention may be individual fibers, or may be a loosely formed web of overlapping and intersecting fibers. The manner of producing the substrate of the present invention is not critical, and suitable substrates can be formed by any one of the conventional techniques for depositing or arranging fibers in a web or layer, including carding, garnetting, air layering, and the like. Such webs and their methods of manufacture are well known in the art, as set forth, for example, in Hoyle, *Bonding as a Nonwoven Design Tool*, TAPPI Proceedings, 1988 Nonwovens Conference, TAPPI Press, 1988.

Any conventional fibers may be used to form the substrate of the present article. For example, suitable fibers may include monofilament, multifilaments, fibrils, staple fibers. The cross sectional profiles of these fibers are also not critical, and fibers having circular, oval, triangular, amorphous may be used. Such fibers include, for example, polyesters, polyamides, polyolefins, regenerated cellulosics, rayons, glass, cottons, ramie, and carbon.

Both woven and nonwoven substrates, or a combination thereof, may be utilized in the present invention. Examples of materials for nonwoven substrates include natural fibers such as cotton, glass, and ramie. Examples of synthetic fibers which may be used in the nonwoven substrate of the present invention include polyester, polypropylene, rayon, acetate polyamide, and carbon. Preferred among the natural materials include rayon, cotton, while preferred synthetic materials include polyester, polyolefin and polyamide. Most preferred among the natural materials include ramie and cotton, while most preferred synthetic materials include polyester, polyolefin, and polyamide. Useful materials for woven substrates which may be utilized in the article of the present invention include rayon, cotton, polyester, polyolefin, and polyamides. Preferred among these materials are polyester, polyolefin, and polyamides. The substrate of the article of manufacture of the present invention is reinforced with a binder composition. If the substrate of the present invention is a web of fibers, the fibers making up the web will be reinforced and bonded together with the binder material. The binder composition of the present invention comprises two component parts. The first component is a backbone characterized by recurring monomeric units derived from monomers selected from the group consisting of one or more α-olefins and one or more unsaturated carboxylic acids; the second is a graft characterized by at least one recurring monomeric unit selected from the group consisting of:

$$-NHC(O)RC(O)NHR_1 \text{ and } -NH-R-C(O)-$$

or a combination thereof, wherein R is an alkylene group of at least about 2 carbon atoms, and $R_1$ is R or aryl.

The backbone preferably comprises from about 50 to about 99.5, more preferably, about 65 to about 99.2, and most preferably from about 80 to about 98 tool percent of the α-olefin, based on the total moles of recurring monomer units in the backbone.

The molecular weight of the backbone component of the binder in the present invention may vary widely in molecular weight. The number average molecular weight of the backbone usually ranges between about 500 to about 6000, preferably between about 1000 to about 3500, as measured by a vapor pressure osmometer.

The α-olefinic component of the copolymer making up the backbone of the present invention may vary widely, and is preferably derived from olefins having from about 2 to about 8 carbon atoms, such as ethylene, propylene, isobutylene, butylene, and hexene. The α-olefin component is more preferably ethylene or propylene. The most preferred α-olefin component is ethylene.

The carboxylic acid component of the backbone of the binder of the present invention may vary widely and can be derived from any conventional unsaturated carboxylic acid. Useful acids include such carboxylic acids, or derivatives thereof, as disclosed in U.S. Pat. No. 3,658,741, which is incorporated herein by reference. Useful carboxylic acids include both monocarboxylic and polycarboxylic acids and derivatives thereof, including esters and anhydrides, which are capable of reacting with an amine function to form an amide linkage, such as acrylic acid, metharylic acid, ethacrylic acid, itaconic acid, crotonic acid, maleic acid and fumaric acid. Also useful are acid halides, amides and esters including acrylyl chloride and acrylamide. Esters which can be used include methyl acrylate, methyl methacrylate, ethyl acrylate and dimethylaminoethyl methacrylate. Also useful are monoesters of dicarboxylic acids, such as methyl hydrogen maleate, methyl hydrogen fumarate, ethyl hydrogen fumarate, and maleic anhydride. Preferred carboxylic acids or derivatives thereof include unsaturated monocarboxylic acids containing from about 3 to about 6 carbon atoms and dicarboxylic acids containing from about 4 to about 8 carbon atoms. Particularly preferred compounds include $\alpha,\beta$-ethylenically unsaturated acids and derivatives thereof. A more preferred $\alpha,\beta$-ethylenically unsaturated mono-carboxylic acid are acrylic acid and methacrylic acid. A most preferred $\alpha,\beta$-ethylenically unsaturated carboxylic acid is acrylic acid.

The backbone preferably comprises about 1% to about 35% of the carboxylic acid component, more preferably about 2% to about 20%, based on the total moles of recurring monomer units in the backbone.

A particularly preferred backbone component is a copolymeric block of ethylene and an $\alpha,\beta$-ethylenically unsaturated monocarboxylic acid having about 3 to about 6 carbon atoms, such as acrylic acid, where the mol % of acid derived units is from about 3.5 % to about 12%, and the number average molecular weight is from about 1500 to about 3500.

As a second essential component, the binder composition of this invention includes one or more second polymeric blocks comprising polyamides. Illustrative of useful polyamides are those characterized by the presence of recurring carbonamide groups as an integral part of the polymer chain which are separated from one another by at least two carbon atoms. These polyamides have recurring unit represented by the general formula:

or a combination thereof in which R it an alkylene group of at least about two carbon atoms, preferably alkylene having from about 2 to about 10 carbon atoms, and $R^1$ is R or aryl. Exemplary of such polyamides are polyamides formed by the reaction of diamines and diacids such as poly(hexamethylene adipamide) (nylon 6,6), poly(hexamethylene sebacamide) (nylon 6, 10), poly(hexamethylene isophthalamide) (6,IP), poly(hexamethylene terephthalamide), (nylon 6,T), poly(heptamethylene pimelamide) (nylon 7,7), poly(octamethylene suberamide) (nylon 8,8), poly(nonamethylene azelamide) (nylon 9,9), poly(decamethylene azelamide)(nylon 10,9), poly(bis[4-aminocyclohexyl]methane-co-dodecanedioic acid)(PACM-12). Also illustrative of useful polyamides are those formed by polymerization of amino acids and derivatives thereof,as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid)(nylon 8), poly(9-aminononanoic acid) (nylon 9), poly( 10-aminodecanoic acid) (nylon 10), poly( 11-aminoundecanoic acid) (nylon 11), poly( 12-aminododecanoic acid) (nylon 12) and the like. Blends of two or more polyamides may also be employed.

Copolymers formed from recurring units of the above referenced polyamides can be used. By way of illustration and not limitation, such polyamide copolymers include: caprolactam-hexamethylene adipamide (nylon 6/6,6), hexamethlyene adipamide-caprolactam (nylon 6,6/6), hexamethylene adipamide/hexamethylene-isophthalamide (nylon 6,6/6IIP), hexamethylene adipamide/hexamethylene-terephthalamide (nylon 6,6/6T,) trimethylene adipamide-hexamethylene-azelaiamide (nylon trimethyl 6,2/6,2), and hexamethylene adipamidehexamethylene-azelaiamide capryllactam (nylon 6,6/6,9/6) as well as others polyamide copolymers which are not particularly delineated here. poly(decamethylene sebacamide) (nylon 10, 10), poly[his(4-amino cyclohexyl)methane-1,10-decanecarboxamide)] (Guiana), Poly(m-xylylene adipamide), poly(p-xylylene sebacamide),poly(2,2,2-trimethyl hexamethylene terephthalamide), poly(piperazine sebacamide), poly(dodecamethylene terephthalamide) (nylon 12,T), and the like.

Preferred polyamides for use in the practice of this invention are poly(caprolactam) and poly(hexamethylene adipamide). The particularly preferred polyamide is poly(caprolactam). The number average molecular weight of the polyamide may vary widely, but usually, the number average molecular weight of the polyamides utilized in the present invention is from about 5000 to about 35,000. In the particularly preferred embodiments, the number average molecular weight is from about 10,000 to about 22,000. Amongst the particularly preferred embodiments, most preferred are those in which the number average molecular weight of the polyamide is about 18,000.

The amount of polyamide included in the composition of the invention may vary widely and is usually from about 5 % to about 85 % percent by weight based on the total weight of the composition. in the preferred embodiments of this invention, the amount of polyamide is from about 15 to about 30 weight percent based on the total weight of the composition; and in the particularly preferred embodiments of the invention the amount of polyamide in the composition is from about 20 to about 28 weight percent based on the total weight of the composition. Amongst the particularly preferred embodiments, most preferred are those embodiments in 5 which the amount of polyamide is from about 22 to about 26 percent by weight based on the total weight of the composition.

The binder optionally may include residual acid functions substituted on the backbone. Carboxyl groups in the amide chain ends, as well as residual carboxyl groups on the copolymer acid, can be neutralized. Cations having valences of 1 to 3 can be used to neutralize the binder of the present invention. Preferably, metallic cations are derived from a group of metals which can be chosen from Groups IA, IIA, IIB, IIA and the transition elements of the Periodic Table of Elements to be used in this process. Metal cations which are preferred are sodium, potassium, magnesium, calcium, barium, zinc and aluminum cations, with sodium, zinc, calcium and magnesium cations being most preferred.

Table I below characterizes the most preferred ethylene acrylic acid copolymers.

TABLE I

| Copolymer Acid | Softening Pt. ASTM E-28 °C. | Softening Pt. ASTM E-28 °F. | Hardness dmm (ASTM D-5 | Density g/cc D-1501 | Brookfield @ 150° C. CPS | Acid No. mg KOH/g | Wt. % Acrylic |
|---|---|---|---|---|---|---|---|
| AC ® 540 | 105 | 266 | 2.0 | .93 | 575 | 40 | 5 |
| AC ® 580 | 102 | 216 | 4.0 | .94 | 650 | 75 | 9.4 |
| AC ® 5120 | 92 | 128 | 11.5 | .94 | 650 | 120 | 15 |

The pendent acid functions can be neutralized up to 100 percent. The acids preferably are neutralized from 15 to 100 percent, and more preferably from 25 to 100 percent.

The most preferred ionomer is the ionomer of the reaction product of copolymer acid B of Table I neutralized to between about 15 and about 1 00 percent with sodium, zinc, magnesium or calcium cations.

The binder compositions of the present invention can be prepared by any suitable method such as described in above referenced U.S. Pat. No. 3,658,741 and in U.S. Pat. No. 5,130,372, which are incorporated herein by reference. For example, an olefin such as ethylene desirably constitutes at least 65% by weight of the monomer feed and the comonomer from 1.0% to 35 % of the feed, preferably 2 to 20% by weight of the feed. Under specific conditions of vapor phase polymerization the ratio by weight of the monomers in the feed and in the product are substantially constant. The ratio of comonomer between feed and product are at most only minor such that products obtained by the invention contain a major portion of ethylene and generally 0.8% to 35% by weight of the comonomer, preferably 2.0% to 20% by weight of the comonomer. The ratio of comonomer in the product to comonomer in the feed is preferably within the range of 0.7:1 to 1.8:1.

The copolymer$ making up the backbone of the present invention preferably having an acid number in the range from about 1 to about 180, with an acid number from about 40 to 160 being preferred, and an acid number from about 40 to 120 being most preferred. The acid number is determined by the number of milligrams of potassium hydroxide needed to neutralize one gram of acid. The number average molecular weight of the most preferred copolymer is from about 500 to about 5000, and preferably from about 1000 to about 3500. The most preferred copolymers of ethylene and acrylic or methacrylic acid contain from about 1% to about 20% by weight acrylic acid or methacrylic acid in the copolymer, preferably about 3.5% to about 12%, and are further characterized by a number average molecular weight between about 1500 to about 3500, and hardness (0.1 mm penetration) between 0.5 to 30, preferably 1 to 10 when tested at room temperature about 25° C. (77° F.) according to ASTM D-5 using a needle with a load of 1 00 grams for 5 seconds.

The copolymer reaction product useful in the present invention is characterized by an acid number of from about 10 to about 200, preferably about 25 to about 150, and most preferably about 40 to about 125 where the acid number is the number of milligrams of KOH used to neutralize one gram of sample. The copolymer reaction product has a Brookfield viscosity of 140° C. of from about 500 to about 5,000, preferably about 500 to about 2,000, and more preferably about 500 to about 1,500.

The copolymer acids are available from Allied-Signal Inc., as A-C® 540(A); A-C® 580(B) and A-C® 5120(C).

In accordance with the present invention up to 100, preferably from about 50 to about 100 and more preferably about 10 to about 30 percent of the carboxylic acid groups in the backbone are reacted with from about 0.1 to about 50, preferably, 0.1 to 40, more preferably about 0.5 to about 30, and most preferably about 5 to about 25 weight percent based on the weight of the reaction product of at least one amide chain derived from at least one amino acid compound. There can be from about 10 to about 30, or about 0.1 to about 10 weight percent of at least one amide derived from at least one amino acid.

Preferably, there are sufficient amide grafts, of sufficient length to confer compatibility of the copolymer reaction product and another polymer, preferably polyamide. The average amide chain length reacted at each carboxyl site is preferably from about 1 to about 250, preferably 1 to 200, with specific embodiments including amide chain lengths of from 1 to 10, and 1 to 5 amide groups. There can be longer amide chainlengths of from 100 to 250 amide groups.

The present invention also includes a process for making an article of manufacture utilizing a substrate and the binder described in detail above. The process for producing the article of the present invention includes two essential steps. First, the binder composition is contacted with the substrate. Second, the substrate is dried at a suitable temperature.

The binder may be applied to the substrate in a wide variety of different forms, depending on the desired characteristics of the finished article. For example, the binder may be applied to the substrate in the form of binder composition wherein the binder is emulsified or dispersed in a solution. Preferably, the solution is aqueous in nature; most preferably, the binder is dispersed in a basic aqueous solution. Suitable bases for use in preparing the binder composition of the present invention include ammonium hydroxide, alkanocamines, morpholine, potassium hydroxide, sodium hydroxide, etc. If an emulsion of the binder solution is to be prepared, any suitable surfactant may be utilized. For example, common surfactants such as ethoxylated nonylphenols, ethoxylated octylphenols, ethoxylated alcohols, ethoxylated sorbitan esters, polyglucosides, etc. may be used.

Preferably, the binder composition utilized in the present article is applied to the substrate or mixed with the fiber as a dispersion in an aqueous solution, and no surfactants are utilized. The elimination of the surfactants in the binder compositions of the present invention is an important feature of the present invention for several reasons. First, elimination of surfactants means that no known compounds with potentially harmful health or environmental effects are applied to the substrate. It is well known that certain surfactants may produce carcinogens upon heating; workplace exposure to these materials or evolution of these materials from the surface of the finished article should be avoided if at all possible. Second, the elimination of the surfactant from the binder composition ensures that the surfactant will not interfere with the interaction between the binder and the materials of the substrate. While not wishing to be bound by any theory, it is believed that the absence of surfactants allows more direct interaction between the carboxyl groups of the binder and the materials of the substrate.

Most preferably, the binder of the present invention is dispersed in a basic aqueous solution of ammonium hydroxide or a suitable amine. The size of the dispersed particles in this composition are generally below 1 micron. The viscosity of this composition is typically between 5 and 2000 cps. at 25° C.

The substrate may be contacted with the binder composition in any conventional manner. For example, the substrate may be saturation padded with the binder, or sprayed, or physically mixed as in the case of fibers, or transferred or kiss rolled. The time required for contacting the binder with the substrate may vary widely, and the contact time will depend largely on the desired characteristics, such as tensile strength, elongation, etc., of the completed article, and on the environment in which the article will be utilized. The contact time will also depend on the characteristics of the materials making up the substrate. However, it is preferred that the binder be in contact with the substrate for seconds to minutes, to ensure that to the binder may adhere to and act on the materials making up the substrate. Most preferably, the binder should remain in contact with the substrate for 2 to 10 seconds.

The amount of binder, calculated on a dry basis, applied to the substrate suitably ranges from about 2 to about 40 parts or more, per 100 parts of substrate, and preferably from 4 to 15.

Following application of the binder composition to the substrate, the impregnated substrate is dried. Any known method may be utilized for drying the substrates. For example, the substrates may be suitably dried by passing them through an oven or through a series of heated cans or the like, or by a combination of cans and ovens, or by air drying. Preferably, oven drying is effected at about 90°–200° C. for less than 1 to 15 minutes. However, many other time-temperature relationships may be employed in the drying step.

The present binder composition features a relatively low drying temperature compared to conventional acrylic binders, which must be cured or dried for at least 2 to 3 minutes at 150°–160° C. The elevated curing temperature required for conventional binder materials may potentially liberate a plurality of harmful or carcinogenic by-products. For example, conventional acrylic binders contain N-methylol functionality, which decompose on heating and curing to produce formaldehyde. The liberated formaldehyde is emitted into the ambient air in the workplace where the bound article are produced, and remains on the bound article following manufacture. In contrast, the binder described above contains no N-methylol functionality which can decompose to produce formaldehyde; in addition, the low drying temperature utilized for the present binder material ensures that evolution of other potentially harmful compounds into the environment is reduced.

The articles produced by the process of the present invention may be utilized for a wide variety of applications, including filter materials, insulation, disposable wipes, medical drapes, garments, geotextiles, personal hygiene products such as incontinence garments, tampons, etc, diapers. The binder composition described above adheres well to both natural and synthetic fabrics, as well as to glass fibers, and forms a high gloss on natural and synthetic materials if utilized in correct proportion. The binder of the present article is useful to coat paper, and may be used in a floor covering. Polish formula to improve gloss, reduce slippage, reduce abrasion and protect the flooring.

The following examples are provided to illustrate the present invention, but it will be understood that they are intended to be illustrative only and not limitative of the invention.

EXAMPLES

I. Preparation of Binder Composition

To prepare the binder composition of the present invention, two representative α-unneutralized and neutralized olefincarboxylic acidpolyamide graft copolymers, ACX ® 611 and ACX ® 696, respectively, available from Allied-Signal, Inc. were obtained.

Each polymer was mixed with water and potassium hydroxide in a pressure vessel, such as a PARR Model 4550 reactor, heated to a temperature of 140° to 180° C. for approximately 30 to 90 minutes, and then rapidly cooled.

The resulting dispersions typically contained particles in the range of 0.01 to 1 microns, with viscosities varying from water thin to a maximum 2000 cps at 25° C.

II. Application to Substrate

Synthetic non-woven substrates of polyester and polypropylene were obtained. The thickness, basis weight, dry tensile strength, wet tensile strength (water) and wet tensile strength (isopropanol) of each fabric substrate are set forth in Table 1 below for the machine direction (M) and cross-machine direction (XM), respectively.

TABLE 1

| Basis Weight (oz.) | Thickness (mm) | Tensile (dry) | | Tensile (water) | | Tensile (isopropanol) | |
|---|---|---|---|---|---|---|---|
| Polyester Fabric | | | | | | | |
| 5.5 | 1.35 | M80 | XM90 | M80 | XM75 | M75 | XM80 |
| Polypropylene Fabric | | | | | | | |
| 5.5 | 1.35 | M75 | XM85 | M75 | XM80 | M80 | XM80 |

A dispersion of a conventional acrylic binder, Rhoplex ® B-15, a product of the Rohm & Haas Co., a dispersion of the ACX ® 611 binder composition, and a dispersion of the ACX ® 696 binder composition were each saturation padded and extracted to 70–80 percent wet pick-up on the substrates in Table 1. The weight of binder applied to each substrate was about 5 to about 20%, based on the total weight of the resulting article.

The acrylic binder, Rhoplex ® B-15, was dried for 2 minutes at 325° F. on the polyester substrate and 2 minutes at 200° F. on the polypropylene substrate. The binder composition prepared with the compounds of the present invention, ACX ® 611 and ACX ® 696, were dried for 2 minutes at 325° F. on polyester. Next, the binders of the present invention were dried for 2 minutes at 200° F. on the polyester and polypropylene substrates.

The results are set forth below.

III. Results 1. Binder Location

On the polyester web the ACX® 611 and ACX® 696 had a dry pick-up roughly 40% of the Rhoplex® B-15. On the polypropylene, the ACX® 611 was 70% of the dry pick-up of Rhoplex® B-15 with the ACX® 696 at approximately 140% of the Rhoplex® B-15 level. The detailed results are shown in Table II below.

TABLE II
TENSILE, BASIS WEIGHT, AND THICKNESS DATA FOR BINDER-FABRIC SYSTEMS POLYESTER

| Sample | Basis Weight | Thickness | Tensile, dry, lbs. | |
|---|---|---|---|---|
| Std. Binder | 6.39 | 1.27 | M177.4 | XM150.2 |
| A-C 611 | 5.83 | 1.49 | M172.0 | XM147.2 |
| A-C696 | 5.86 | 1.31 | M158.5 | XM213.2 |
| POLYPROPYLENE | | | | |
| Std. Binder | 5.9 | 1.3 | M110.3 | XM166.8 |
| A-C 611 | 5.77 | 1.31 | M109.4 | XM165.0 |
| A-C 696 | 6.01 | 1.28 | M112.6 | XM155.7 |

2. Physical Properties

The grab tensile strength (ASTM test method D 1682–64, reapproved 1975) was run to determine tensile strength, % elongation, and toughness of the treated polyester and polypropylene webs. The tests were run on dry non-wovens and samples wet with water as well as isopropanol.

A. Tensile Strength

On polypropylene all three binders displayed equivalent strength properties, dry, water wet, and isopropanol wet. On polyester the ACX® 611 and ACX® 696 yield the strength properties at approximately 40% of the dry weight pickup of the Rhoplex® B-15.

B. Elongation

With respect to elongation, on water wet polypropylene the binders of the present invention were only slightly inferior to the Rhoplex® B-15. On the isopropanol wet polypropylene samples, the samples were equivalent.

The elongation data on the water wet polyester indicates the Rhoplex® B-15 and ACX® 611 gave equivalent performance, with the ACX® 696 providing improved elongation properties.

The averaged results, for both machine and cross machine direction, are set forth in Table III below.

C. Toughness

The comparative toughness of the polypropylene and polyester webs was also measured wet with both water and isopropanol.

On water wet polypropylene the ACX® 611 was slightly inferior to the Rhoplex® B-15 composition. The ACX® 696 composition gave equivalent results to the Rhoplex® B-15 composition. With isopropanol as the solvent, both polymers, ACX® 611 and ACX® 696 were tougher than the control, Rhoplex® B-15.

On water wet polyester the ACX® 611 was slightly inferior to the Rhoplex® B-15 control with the ACX® 696 distinctly tougher. The isopropanol wet polyester gave similar results.

The results are set forth in Table III below.

TABLE III
TENSILE STRENGTH AND PHYSICAL PROPERTIES FOR BINDERS

| Wet (water Sample | Tensile | Elongation | Toughness |
|---|---|---|---|
| POLYESTER | | | |
| Std | M148.5 | M51.7 | M325.9 |
| | XM132.8 | XM69.5 | XM413.9 |
| A-C 611 | M159.5 | M49.5 | M297.6 |
| | XM140.5 | XM69.03 | XM388.3 |
| A-C 696 | M154.9 | M72.1 | M722.8 |
| | XM202.4 | XM73.8 | XM747.9 |
| POLYPROPYLENE | | | |
| STD | M115.0 | M75.8 | M732.7 |
| | XM203.2 | XM57.4 | XM871.5 |
| A-C 611 | M120.2 | M66.9 | M322.1 |
| | XM204.0 | XM53.0 | XM401.2 |
| A-C 696 | M119.3 | M50.0 | M750.2 |
| | XM211.3 | XM49.7 | XM735.5 |
| Wet (Isopropanol) POLYESTER | | | |
| STD | M135.2 | M70.0 | M347.2 |
| | XM128.5 | XM66.7 | XM334.7 |
| A-C 611 | M132.3 | M60.0 | M279.5 |
| | XM114.7 | XM51.8 | XM203.9 |
| A-C 696 | M147.7 | M59.8 | M509.1 |
| | XM137.1 | XM54.1 | XM478.1 |
| POLYPROPYLENE | | | |
| STD | M133.9 | M65.3 | M661.2 |
| | XM137.6 | XM51.1 | XM558.5 |
| A-C 611 | M137.5 | M61.0 | M700.0 |
| | XM141.1 | XM56.2 | XM667.3 |
| A-C 696 | M142.5 | M52.0 | M718.1 |
| | XM129.9 | XM57.1 | XM702.2 |

Conclusions

The binder compositions of the present invention, derived from ethylene/acrylic acid acid/polyamide graft copolymers, achieve similar strength properties at lower percent add-on levels and lower processing temperatures than conventional acrylic latex polymers.

While exemplary embodiments of the invention have been described, the true scope of the invention is to be determined from the following claims.

What is claimed is:

1. A nonwoven fabric comprising:
   (a) a web of fibers, said web consisting of overlap regions where said fibers intersect and open regions; and
   (b) a binder material in adhesive contact with said fibers and substantially concentrated in overlap regions of said web, said binder comprising a polymeric backbone comprising recurring monomeric units derived from monomers selected from the group consisting of one or more α-olefins and one or more unsaturated carboxylic acids, having grafted thereon by a divalent amide linkage one or more polymeric grafts comprising at least one recurring monomeric unit derived from monomers selected from the group consisting of:

—NHC(O)RC(O)NHR$_1$ and —NH—R—C(O)— a combination thereof in wherein R is an alkylene group of at least about 2 carbon atoms, and R$_1$ is R or aryl.

2. The nonwoven fabric of claim 1 wherein said polymeric graft comprises recurring monomeric units represented by the formula:

—NH—R—C(O)— wherein R is an alkylene group with 2 to about 12 carbon atoms.

3. The nonwoven fabric of claim 2 wherein R is an alkylene group with 6 to about 12 carbon atoms.

4. The nonwoven fabric of claim 2 wherein R is an alkylene group with 6 carbon atoms.

5. The nonwoven fabric of claim 1 wherein said polymeric graft comprises recurring monomeric units represented by the formula:

—NHC(O)RC(O)NHR$_1$ wherein R and R$_1$ may be the same or different, and R is an alkylene group with 2 to about 12 carbon atoms.

6. The nonwoven fabric of claim 1 wherein said polymeric graft comprises recurring monomeric units represented by the formula:

—NHC(O)RC(O)NHR$_1$ wherein R and R$_1$ may be the same or different, and R is an alkylene group with 6 to about 12 carbon atoms.

7. The nonwoven fabric of claim 1 wherein said polymeric graft comprises recurring monomeric units represented by the formula:

—NHC(O)RC(O)NHR$_1$ wherein R and R$_1$ are an alkylene group with 2 to about 12 carbon atoms.

8. The nonwoven fabric of claim 1 wherein said polymeric graft comprises recurring monomeric units represented by the formula:

—NHC(O)RC(O)NHR$_1$ wherein R and R$_1$ are an alkylene group with 6 to about 12 carbon atoms.

9. The nonwoven fabric of claim 1 wherein said α-olefin is selected from the group consisting of ethylene and propylene.

10. The nonwoven fabric of claim 1 wherein said α-olefin is ethylene.

11. The nonwoven fabric of claim 1 wherein said carboxylic acid is an α,β-ethylenically unsaturated carboxylic acid selected from the group consisting of acrylic acid, methacrylic acid, crotonic acid, maleic acid and fumaric acid, and mixtures thereof.

12. The nonwoven fabric of claim 1 wherein said carboxylic acid is acrylic acid.

13. The nonwoven fabric of claim 1 wherein said polymeric graft comprises about 10 to about 30 weight percent of the binder based on the total weight of the binder.

14. The nonwoven fabric of claim 1 wherein said polymeric graft comprises about 0.1 to about 10 weight percent of the binder.

15. The nonwoven fabric of claim 11 wherein the binder is comprised of about 65 to about 98 mole percent of the α-olefin and about 2 to about 35 weight percent of the α,β-ethylenically unsaturated carboxylic acid.

16. The nonwoven fabric of claim 1 wherein said binder is neutralized with at least one cation selected from the group consisting of metallic cations having a valence of 1 to about 3.

17. The nonwoven fabric of claim 16 wherein the cation is a metal selected from the group consisting of Groups 1A, IIA, IIB, IIIA, and the transition elements of the Periodic Table Of Elements.

18. The nonwoven fabric of claim 16 wherein the cation is selected from the group consisting of sodium, potassium, magnesium, calcium, barium, zinc, and aluminum.

19. The nonwoven fabric of claim 16 wherein the cation is zinc.

20. A nonwoven fabric comprising:
(a) a web of fibers, said web consisting of overlap regions where said fibers intersect and open regions; and
(b) a binder material in adhesive contact with said fibers and substantially concentrated in overlap regions of said web, said binder comprising a polymeric backbone comprising recurring monomeric units selected from the group consisting of ethylene and acrylic acid, said backbone having grafted thereto by a divalent amide linkage one or more polymeric grafts comprising aminocaproic acid.

21. A process for producing a nonwoven fabric, which comprises the following steps:
(1) contacting a fiber substrate with a binder comprising a polymeric backbone comprising recurring monomeric units derived from monomers selected from the group consisting of one or more α-olefins and one or more unsaturated carboxylic acids, said backbone having grafted thereto by a divalent amide linkage one or more polymeric grafts comprising at least one recurring monomeric unit selected from the group consisting of:

—NHC(O)RC(O)NHR$_1$ and —NH—R—C(O)— a combination thereof, wherein R is an alkylene group of at least about 2 carbon atoms, and R$_1$ is R or aryl;
(2) drying said binder composition.

22. A process as recited in claim 21, wherein said liquid medium is an aqueous solution.

23. A process as recited in claim 22, wherein said solution is an alkaline solution.

24. A process as recited in claim 22, wherein said solution is an aqueous solution of ammonium hydroxide.

25. A process as recited in claim 21, wherein said drying step (2) is conducted at a temperature of less than about 200° F.

26. A process as recited in claim 21, wherein said fiber substrate is a web of overlapping and intersecting fibers.

27. A process as recited in claim 26, wherein said web is a nonwoven web.

* * * * *